(12) United States Patent
Nishiguchi et al.

(10) Patent No.: US 12,459,514 B2
(45) Date of Patent: Nov. 4, 2025

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Haruhiko Nishiguchi, Wako (JP); Tomotaka Teramachi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 186 days.

(21) Appl. No.: 18/177,147

(22) Filed: Mar. 2, 2023

(65) Prior Publication Data

US 2023/0322231 A1 Oct. 12, 2023

(30) Foreign Application Priority Data

Mar. 30, 2022 (JP) .................... 2022-055944

(51) Int. Cl.
*B60W 30/18* (2012.01)
*B60W 40/072* (2012.01)
*B60W 60/00* (2020.01)

(52) U.S. Cl.
CPC .... *B60W 30/18163* (2013.01); *B60W 40/072* (2013.01); *B60W 60/001* (2020.02); *B60W 2554/4041* (2020.02); *B60W 2554/80* (2020.02)

(58) Field of Classification Search
CPC ......... B60W 30/18163; B60W 60/001; B60W 40/072; B60W 2554/4041; B60W 2554/80
USPC ........................................................ 701/23
See application file for complete search history.

(56) References Cited

U.S. PATENT DOCUMENTS

| 10,676,087 | B2 * | 6/2020 | Nishiguchi | ........... B60W 50/10 |
| 11,072,334 | B2 * | 7/2021 | Aoki | ................. B60W 10/20 |
| 11,220,290 | B2 * | 1/2022 | Mizoguchi | ...... B60W 30/18163 |
| 11,498,563 | B2 * | 11/2022 | Hirosawa | ........ B60W 30/18163 |
| 11,541,910 | B1 * | 1/2023 | Ganguli | ................ B60Q 5/006 |

(Continued)

FOREIGN PATENT DOCUMENTS

| JP | 2018-055154 | 4/2018 |
| JP | 2019-049774 | 3/2019 |

(Continued)

OTHER PUBLICATIONS

Japanese Office Action for Japanese Patent Application No. 2022-055944 mailed Feb. 6, 2024.

*Primary Examiner* — Luis A Martinez Borrero
(74) *Attorney, Agent, or Firm* — Amin, Turocy & Watson, LLP

(57) ABSTRACT

A vehicle control device of an embodiment includes a recognizer that recognizes a peripheral situation of a host vehicle and a driving controller that controls one or both of steering and speed of the host vehicle on the basis of a result of recognition performed by the recognizer. In a case where the host vehicle traveling in a first lane performs a lane change to a second lane adjacent to the first lane and a case where it is recognized by the recognizer that there is another vehicle in the vicinity of the host vehicle, the driving controller specifies a position of the other vehicle by changing a range to be recognized as the second lane on the basis of a relative speed between the host vehicle and the other vehicle, and executes control related to the lane change on the basis of the specified position.

9 Claims, 6 Drawing Sheets

(56) References Cited

U.S. PATENT DOCUMENTS

| | | | | |
|---|---|---|---|---|
| 11,613,257 B2* | 3/2023 | Nishimura | ........... | B60W 60/001 |
| | | | | 701/23 |
| 11,628,881 B2* | 4/2023 | Igarashi | ............... | G05D 1/0088 |
| | | | | 701/23 |
| 11,644,834 B2* | 5/2023 | Ditty | .................. | G06F 15/7807 |
| | | | | 701/23 |
| 11,667,293 B2* | 6/2023 | Oh | ........................ | B60W 50/14 |
| | | | | 701/23 |
| 12,065,142 B2* | 8/2024 | Maeda | ............ | B60W 30/0956 |
| 2016/0114811 A1* | 4/2016 | Matsuno | ............... | B60W 10/18 |
| | | | | 701/23 |
| 2016/0313133 A1* | 10/2016 | Zeng | ................. | B60W 60/0011 |
| 2017/0248959 A1* | 8/2017 | Matsubara | ...... | B60W 30/18163 |
| 2018/0052458 A1* | 2/2018 | Tsuji | ....................... | G08G 1/16 |
| 2018/0178714 A1* | 6/2018 | Fujii | .................... | B60W 30/16 |
| 2019/0023273 A1* | 1/2019 | Ishioka | ................ | G08G 1/167 |
| 2019/0047561 A1* | 2/2019 | Nishiguchi | ........... | B60W 50/10 |
| 2019/0072970 A1* | 3/2019 | Izumori | .......... | B60W 30/18145 |
| 2019/0073540 A1 | 3/2019 | Yamada et al. | | |
| 2019/0084558 A1* | 3/2019 | Kaminade | ............ | B60W 30/09 |
| 2019/0084572 A1* | 3/2019 | Oishi | ..................... | B60Q 1/40 |
| 2019/0084619 A1* | 3/2019 | Mizoguchi | ........ | B60W 60/0013 |
| 2019/0143982 A1* | 5/2019 | Hashimoto | ............ | B60W 30/12 |
| | | | | 701/23 |
| 2019/0143983 A1* | 5/2019 | Hashimoto | .......... | G05D 1/0088 |
| | | | | 701/23 |
| 2019/0265709 A1* | 8/2019 | Saikyo | .................. | B60W 30/16 |
| 2019/0276029 A1* | 9/2019 | Umeda | ................. | G06V 20/584 |
| 2019/0382019 A1* | 12/2019 | Abe | .................... | B60W 30/143 |
| 2019/0382022 A1* | 12/2019 | Niibo | ................. | B60W 10/184 |
| 2019/0384305 A1* | 12/2019 | Niibo | .................. | B60W 30/08 |
| 2020/0001867 A1* | 1/2020 | Mizutani | .................. | G08G 1/166 |
| 2020/0094836 A1* | 3/2020 | Aoki | ...................... | B60W 10/04 |
| 2020/0094838 A1* | 3/2020 | Nishimura | ............ | G05D 1/0061 |
| 2020/0180633 A1* | 6/2020 | Wu | .................. | B60W 30/18163 |
| 2020/0307593 A1* | 10/2020 | Hirosawa | ................ | B60W 10/04 |
| 2020/0377102 A1* | 12/2020 | Kuwahara | ............. | B60W 40/04 |
| 2021/0016778 A1* | 1/2021 | Yashiro | .................. | B60W 10/04 |
| 2021/0034063 A1* | 2/2021 | Oguro | .................... | B60W 30/09 |
| 2021/0101600 A1* | 4/2021 | Kato | ......................... | B60Q 1/40 |
| 2021/0107510 A1* | 4/2021 | Kato | ................ | B60W 30/18163 |
| 2021/0146943 A1* | 5/2021 | Oniwa | ..................... | B60R 21/00 |
| 2021/0146954 A1* | 5/2021 | Kaji | ..................... | B60W 30/143 |
| 2021/0146962 A1* | 5/2021 | Kaji | ...................... | B60W 30/17 |
| 2021/0197824 A1* | 7/2021 | Kim | .................. | B60W 30/0956 |
| 2021/0300351 A1 | 9/2021 | Kumano et al. | | |
| 2021/0300414 A1 | 9/2021 | Yasui et al. | | |
| 2022/0055615 A1* | 2/2022 | Inoue | ..................... | B60W 30/09 |
| 2022/0135039 A1* | 5/2022 | Jardine | ............ | B60W 30/18159 |
| | | | | 701/26 |
| 2022/0306095 A1* | 9/2022 | Maeda | .............. | B60W 30/0956 |
| 2022/0348227 A1* | 11/2022 | Foster | ..................... | B60Q 1/507 |
| 2023/0111387 A1* | 4/2023 | Hashimoto | ............... | G05D 1/81 |
| | | | | 701/23 |
| 2023/0140569 A1* | 5/2023 | Foster | ................. | B60W 30/146 |
| | | | | 701/400 |
| 2023/0147535 A1* | 5/2023 | Terazawa | ................ | G01C 21/30 |
| 2023/0150507 A1* | 5/2023 | Hiramatsu | ........... | B60W 60/005 |
| | | | | 701/26 |
| 2023/0286509 A1* | 9/2023 | Kume | ................. | B60W 60/0051 |
| 2023/0382371 A1* | 11/2023 | Park | ....................... | B60W 30/08 |
| 2024/0174230 A1* | 5/2024 | Saito | .................... | B60W 30/143 |

FOREIGN PATENT DOCUMENTS

| | | |
|---|---|---|
| JP | 2019-217825 | 12/2019 |
| JP | 2021-160532 | 10/2021 |
| JP | 2021-160533 | 10/2021 |

* cited by examiner

| RELATIVE SPEED | EXTENDED RANGE |
|---|---|
| $\Delta V \leq Vth1$ | LANE-CHANGE DESTINATION LANE |
| $Vth1 < \Delta V \leq Vth2$ | LANE-CHANGE DESTINATION LANE ± ONE LANE |
| $\Delta V > Vth2$ | LANE-CHANGE DESTINATION LANE ± TWO LANES |

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2022-055944, filed Mar. 30, 2022, the content of which is incorporated herein by reference.

BACKGROUND

Field of the Invention

The present invention relates to a vehicle control device, a vehicle control method, and a storage medium.

Description of Related Art

In recent years, efforts have been made to provide access to sustainable transport systems that also consider the people in the most vulnerable positions among traffic participants. In order to realize this, efforts have been concentrated on research and development to further improve the safety and convenience of traffic through research and development related to automated driving technology. In connection with this, a technique of, when a host vehicle performs a lane change from a first lane to a second lane, suppressing the approach of another vehicle that performs a lane change from a third lane to the second lane, the third lane being on the opposite side of the first lane with the second lane interposed therebetween, or a technique of deciding the search range or setting range of target position candidates during a lane change according to the type of lane change is known (for example, Japanese Unexamined Patent Application, First Publication No. 2018-055154 and Japanese Unexamined Patent Application, First Publication No. 2019-217825)

SUMMARY

Incidentally, in automated driving technology, an external sensor that recognizes the peripheral situation of a host vehicle may not be able to correctly recognize the position of another vehicle due to recognition errors caused by performance limits, the surrounding environment, and the like. In this case, it is impossible to correctly recognize the traveling lane of the other vehicle and to execute appropriate lane change control.

The present invention was contrived in view of such circumstances, and one object thereof is to provide a vehicle control device, a vehicle control method, and a storage medium that make it possible to execute more appropriate lane change control. Further, this contributes to the development of a sustainable transport system.

The following configurations are adopted in a vehicle control device, a vehicle control method, and a storage medium according to this invention.

(1) According to an aspect of this invention, there is provided a vehicle control device including: a recognizer that recognizes a peripheral situation of a host vehicle; and a driving controller that controls one or both of steering and speed of the host vehicle on the basis of a result of recognition performed by the recognizer, wherein, in a case where the host vehicle traveling in a first lane performs a lane change to a second lane adjacent to the first lane and a case where it is recognized by the recognizer that there is another vehicle in the vicinity of the host vehicle, the driving controller specifies a position of the other vehicle by changing a range to be recognized as the second lane on the basis of a relative speed between the host vehicle and the other vehicle, and executes control related to the lane change on the basis of the specified position.

(2) In the aspect of the above (1), the driving controller extends a lane width of the second lane in which the other vehicle travels to become larger as a distance from the host vehicle increases with a position that is a first predetermined distance away from the host vehicle as a reference.

(3) In the aspect of the above (2), the driving controller does not extend the second lane beyond a second predetermined distance that is farther from the host vehicle than the first predetermined distance.

(4) In the aspect of the above (1), in a case where the second lane is extended, the driving controller extends the second lane symmetrically in a road width direction from a center of the second lane.

(5) In the aspect of the above (1), the driving controller changes an extended range of the second lane on the basis of the relative speed between the host vehicle and the other vehicle.

(6) In the aspect of the above (1), in a case where a curvature of a road on which the host vehicle travels is equal to or greater than a threshold, the driving controller changes the range to be recognized as the second lane in association with the curvature.

(7) According to an aspect of this invention, there is provided a vehicle control device including: a recognizer that recognizes a peripheral situation of a host vehicle; and a driving controller that controls one or both of steering and speed of the host vehicle on the basis of a result of recognition performed by the recognizer, wherein, in a case where the host vehicle traveling in a first lane performs a lane change to a second lane adjacent to the first lane and a case where it is recognized by the recognizer that there is another vehicle in the vicinity of the host vehicle, the driving controller specifies a position of the other vehicle by extending a region to be recognized during the lane change of the host vehicle to include a region other than the second lane on the basis of a relative speed between the host vehicle and the other vehicle, and executes control related to the lane change on the basis of the specified position.

(8) According to an aspect of this invention, there is provided a vehicle control method including causing a computer to: recognize a peripheral situation of a host vehicle; execute driving control to control one or both of steering and speed of the host vehicle on the basis of a recognized result; specify, in a case where the host vehicle traveling in a first lane performs a lane change to a second lane adjacent to the first lane and a case where it is recognized that there is another vehicle in the vicinity of the host vehicle, a position of the other vehicle by changing a range to be recognized as the second lane on the basis of a relative speed between the host vehicle and the other vehicle; and execute control related to the lane change on the basis of the specified position.

(9) According to an aspect of this invention, there is provided a computer readable non-transitory storage medium having a program stored therein, the program causing a computer to: recognize a peripheral situation of a host vehicle; execute driving control to control one or both of steering and speed of the host vehicle on the basis of a recognized result; specify, in a case where the host vehicle traveling in a first lane performs a lane change to a second lane adjacent to the first lane and a case where it is recognized that there is another vehicle in the vicinity of the host vehicle, a position of the other vehicle by changing a range to be recognized as the second lane on the basis of a relative speed between the host vehicle and the other vehicle; and execute control related to the lane change on the basis of the specified position.

According to the aspect of the above (1) to (9), it is possible to execute more appropriate lane change control.

BRIEF DESCRIPTION OF THE DRAWINGS

FIG. 4 is a diagram illustrating an example of content of an adjustment table.

DESCRIPTION OF EMBODIMENTS

Hereinafter, an embodiment of a vehicle control device, a vehicle control method, and a storage medium of the present invention will be described with reference to the accompanying drawings.

Overall Configuration

Figure 1:
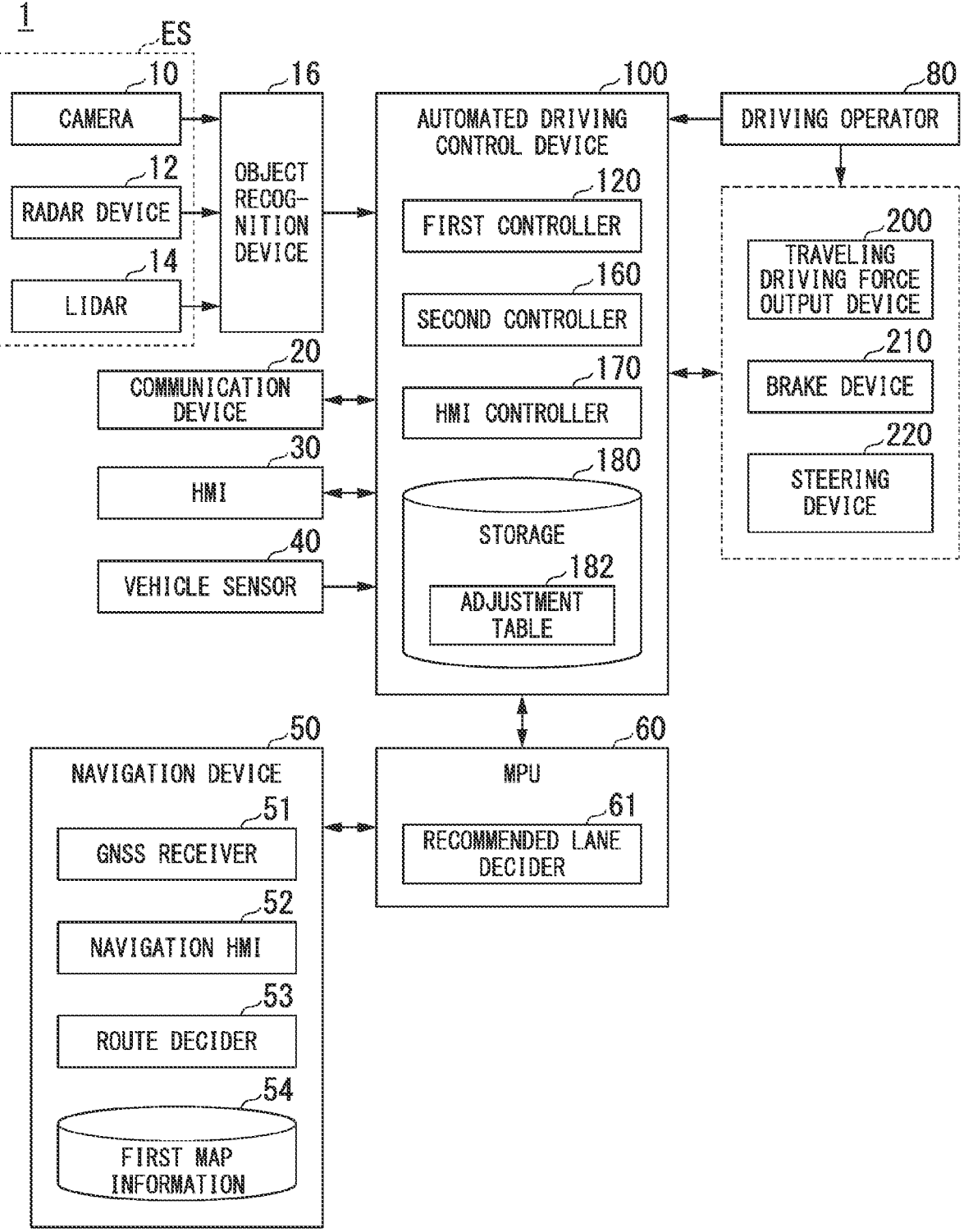
FIG. 1 is a configuration diagram of a vehicle system using a vehicle control device according to an embodiment.

FIG. 1 is a configuration diagram of a vehicle system 1 using a vehicle control device according to an embodiment. A vehicle having the vehicle system 1 mounted therein (hereinafter referred to as a host vehicle M) is, for example, a two-wheeled, three-wheeled, or four-wheeled vehicle or the like, and the driving source thereof is an internal-combustion engine such as a diesel engine or a gasoline engine, an electric motor, or a combination thereof. The electric motor operates using power generated by a generator connected to an internal-combustion engine or discharging power of a secondary battery or a fuel cell. As an example, an embodiment in which the vehicle control device is applied to an automated driving vehicle will be described below. Automated driving involves, for example, automatically controlling one or both of steering or acceleration/deceleration of the host vehicle M to execute driving control. Driving control of the host vehicle M may include, for example, various types of driving assistance such as adaptive cruise control (ACC), auto lane changing (ALC), or a lane keeping assistance system (LKAS). The automated driving vehicle may be partially or wholly controlled by manual driving by an occupant (a driver).

The vehicle system 1 includes, for example, a camera (an example of an image capturer) 10, a radar device 12, a light detection and ranging (LIDAR) 14, an object recognition device 16, a communication device 20, a human machine interface (HMI) 30, a vehicle sensor 40, a navigation device 50, a map positioning unit (MPU) 60, a driving operator 80, an automated driving control device 100, a traveling driving force output device 200, a brake device 210, and a steering device 220. These devices or instruments are connected to each other through a multiplex communication line such as a controller area network (CAN) communication line, a serial communication line, a wireless communication network, or the like. The configuration shown in FIG. 1 is merely an example, and some portions of the configuration may be omitted, or other configurations may be further added. A combination of the camera 10, the radar device 12, and the LIDAR 14 is an example of an "external sensor ES." The external sensor ES may include other detectors that recognize the peripheral situation of a vehicle, and may include the object recognition device 16. The automated driving control device 100 is an example of a "vehicle control device."

The camera 10 is a digital camera using a solid-state imaging element such as, for example, a charge coupled device (CCD) or a complementary metal oxide semiconductor (CMOS). The camera 10 is installed at any point on the host vehicle M. For example, in a case where a forward image of the host vehicle M is captured, the camera 10 is installed on the upper portion of the front windshield, the rear surface of the rear-view mirror, or the like. In a case where a rearward image of the host vehicle M is captured, the camera 10 is installed on the upper portion of the rear windshield, the back door, or the like. In a case where a sideward and back-sideward image of the host vehicle M is captured, the camera 10 is installed on the side mirror or the like. The camera 10, for example, repeatedly captures an image of the vicinity of the host vehicle M periodically. The camera 10 may be a stereo camera.

The radar device 12 radiates radio waves such as millimeter waves to the vicinity of the host vehicle M, and detects radio waves (reflected waves) reflected from an object to detect at least the position (distance to and orientation of) of the object. The radar device 12 is installed at any point on the host vehicle M. The radar device 12 may detect the position and speed of an object with a frequency modulated continuous wave (FM-CW) system.

The LIDAR 14 irradiates the vicinity of the host vehicle M with light (or electromagnetic waves having a wavelength close to that of light), and measures scattered light. The LIDAR 14 detects a distance to an object on the basis of a time from light emission to light reception. The irradiation light is, for example, pulsed laser light. The LIDAR 14 is installed at any point on the host vehicle M.

The object recognition device 16 recognizes the position, type, speed, or the like of an object by performing a sensor fusion process on the results of detection performed by some or all of the camera 10, the radar device 12, and the LIDAR 14 included in the external sensor ES. The object recognition device 16 outputs the recognition results to the automated driving control device 100. The object recognition device 16 may output the detection results of the camera 10, the radar device 12, and the LIDAR 14, as they are, to the automated driving control device 100. The object recognition device 16 may be omitted from the vehicle system 1.

The communication device 20 communicates another vehicle in the vicinity of the host vehicle M using, for example, a cellular network, a Wi-Fi network, Bluetooth (registered trademark), dedicated short range communication (DSRC), or the like, or communicates with various types of server devices through a wireless base station.

The HMI 30 presents various types of information to an occupant of the host vehicle M under the control of an HMI controller 170, and accepts an input operation performed by the occupant. The HMI 30 includes, for example, various types of display devices, a speaker, a switch, a microphone, a buzzer, a touch panel, a key, and the like. Various types of display devices are, for example, a liquid crystal display (LCD), an organic electro luminescence (EL) display device, and the like. The display device is provided, for example, in the vicinity of the front of a driver's seat (a seat closest to the steering wheel) in an instrument panel, and is installed at a position that can be visually recognized by an occupant from a gap in the steering wheel or over the steering wheel. The display device may be installed in the center of the instrument panel. The display device may be a head up display (HUD). The HUD projects an image onto a portion of the front windshield in front of the driver's seat to thereby allow the eyes of the occupant who sits on the driver's seat to visually recognize a virtual image. The display device displays an image which is generated by the HMI controller 170 to be described later. The switch may include a driving changeover switch or the like that switches between automated driving and manual driving by an occupant. The switch may include, for example, a blinker switch (direction indicator). The blinker switch is provided, for example, on a steering column or a steering wheel. The blinker switch is an example of an operator that accepts, for example, an occupant's instruction to change the lane of the host vehicle M.

The vehicle sensor 40 includes a vehicle speed sensor that detects the speed of the host vehicle M, an acceleration sensor that detects an acceleration, a yaw rate sensor that detects an angular velocity around a vertical axis, an orientation sensor that detects the direction of the host vehicle M, or the like. The vehicle sensor 40 may include a steering angle sensor that detects the steering angle of the host vehicle M (which may be the angle of the steering wheel or may be the operation angle of the steering wheel). The vehicle sensor 40 may include a position sensor that acquires the position of the host vehicle M. The position sensor is, for example, a sensor that acquires position information (longitude and latitude information) from a Global Positioning System (GPS) device. The position sensor may be a sensor that acquires position information using a global navigation satellite system (GNSS) receiver 51 of the navigation device 50.

The navigation device 50 includes, for example, the GNSS receiver 51, a navigation HMI 52, and a route decider 53. The navigation device 50 holds first map information 54 in a storage device such as a hard disk drive (HDD) or a flash memory. The GNSS receiver 51 specifies the position of the host vehicle M on the basis of a signal received from a GNSS satellite. The position of the host vehicle M may be specified or complemented by an inertial navigation system (INS) in which an output of the vehicle sensor 40 is used. The navigation HMI 52 includes a display device, a speaker, a touch panel, a key, and the like. A portion or the entirety of the navigation HMI 52 may be shared with the above-described HMI 30. The route decider 53 decides, for example, a route (hereinafter, a route on a map) from the position (or any input position) of the host vehicle M specified by the GNSS receiver 51 to a destination input by an occupant using the navigation HMI 52 with reference to the first map information 54. The first map information 54 includes, for example, information to which information on lanes is added in units of roads (hereinafter referred to as lane information). The lane information includes, for example, nodes indicating the start and end of a road section and links representing the shape of a road between nodes. The lane information may include the number of lanes, the number of lane increases or decreases, and the direction of lane increase or decrease (information indicating which side of the lane increases or decreases in the direction of travel on the road) in units of roads. The first map information 54 may include the distance and curvature of a road section, the type of road (for example, an expressway or an ordinary road), point of interest (POI) information, and the like. The route on a map is output to the MPU 60. The navigation device 50 may perform route guidance using the navigation HMI 52 on the basis of the route on a map. The navigation device 50 may be realized by the function of a terminal device such as, for example, a smartphone or a tablet terminal possessed by an occupant. The navigation device 50 may transmit its current position and destination to a navigation server using the communication device 20, and acquire the same route as the route on a map from the navigation server. The first map information 54 may be stored in a storage 180 instead of the navigation device 50.

The MPU 60 includes, for example, a recommended lane decider 61. The recommended lane decider 61 divides the route on a map provided from the navigation device 50 into a plurality of blocks (for example, divides the route on a map every 100 [m] in a vehicle traveling direction), and decides a recommended lane from the lane information of the first map information 54 for each block. The recommended lane decider 61 may decide a recommended lane in units of roads stored in the first map information 54. For example, the recommended lane decider 61 makes a decision on which lane from the left (or the right) to travel in. In a case where a branch point is present in the route on a map, the recommended lane decider 61 decides a recommended lane so that the host vehicle M can travel along a logical route for advancing to a branch destination.

The driving operator 80 includes, for example, the steering wheel, an accelerator pedal, a brake pedal, a shift lever, and other operators. A sensor that detects the amount of operation or the presence or absence of operation is installed on the driving operator 80, and the detection results are output to the automated driving control device 100, or some or all of the traveling driving force output device 200, the brake device 210, and the steering device 220. The steering wheel is an example of "an operator that accepts a steering operation by a driver." The operator does not necessarily have to be annular, and may be in the form of variant steering, a joystick, a button, or the like.

The automated driving control device 100 includes, for example, a first controller 120, a second controller 160, the HMI controller 170, and the storage 180. The first controller 120, the second controller 160, and the HMI controller 170 are realized by a hardware processor such as, for example, a central processing unit (CPU) executing a program (software). Some or all of these components may be realized by hardware (a circuit unit; including circuitry) such as a large scale integration (LSI), an application specific integrated circuit (ASIC), a field-programmable gate array (FPGA), or a graphics processing unit (GPU), and may be realized by software and hardware in cooperation. The program may be stored in a storage device such as the HDD or the flash memory (a storage device including a non-transitory storage medium) of the automated driving control device 100 in advance, may be stored in a detachable storage medium such as a DVD or a CD-ROM, or may be installed in the HDD or the flash memory of the automated driving control device 100 by the storage medium (the non-transitory storage medium) being mounted in a drive device. A combination of a behavior plan generator 140 and the second controller 160 are an example of a "driving controller."

The storage 180 may be realized by various storage devices described above, a solid state drive (SSD), an electrically erasable programmable read only memory (EEPROM), a read only memory (ROM), a random access memory (RAM), or the like. The storage 180 stores, for example, an adjustment table 182, programs, various types of other information, and the like. The adjustment table 182 is a table for adjusting, in a case where it is determined whether the host vehicle M executes a lane change from a traveling lane (first lane) to an adjacent lane (second lane), the range of the adjacent lane in accordance with the relative speed between the host vehicle M and the other vehicle. The details of the adjustment table 182 will be described later. The storage 180 may store, for example, the first map information 54.

Figure 2:
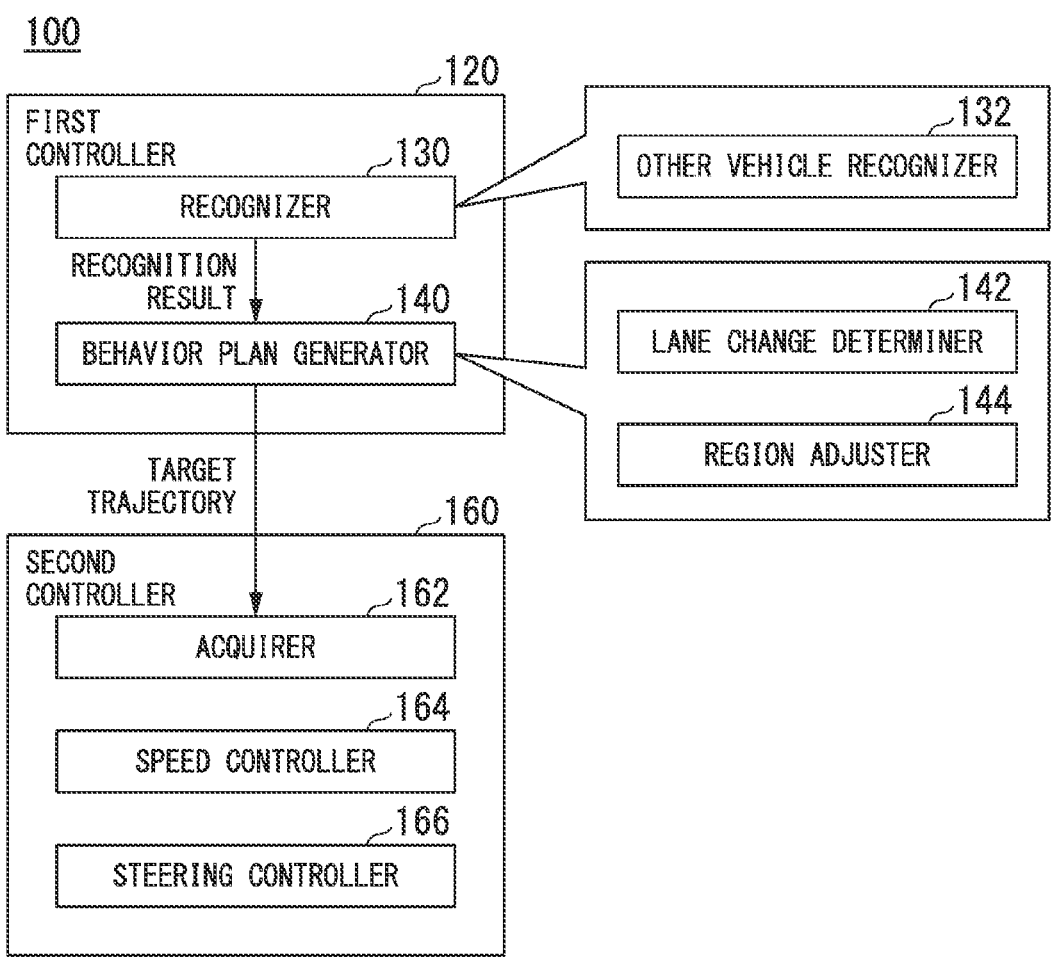
FIG. 2 is a functional configuration diagram of a first controller and a second controller according to the embodiment.

FIG. 2 is a functional configuration diagram of the first controller 120 and the second controller 160 according to the embodiment. The first controller 120 includes, for example, a recognizer 130 and the behavior plan generator 140. The first controller 120 concurrently realizes, for example, a function based on artificial intelligence (AI) and a function based on a model imparted in advance. For example, a function of "recognizing a point of intersection" may be realized by the recognition of a point of intersection based on deep learning or the like and recognition based on conditions (such as a signal for which pattern matching is possible or a road sign) imparted in advance being concurrently executed, and performing comprehensive evaluation by performing scoring on both. Thereby, the reliability of automated driving is secured.

The recognizer 130 recognizes the peripheral situation of the host vehicle M. For example, the recognizer 130 recognizes the state of the position, speed, acceleration, or the like of an object located in the vicinity of the host vehicle M on the basis of information input from the external sensor ES. The position of the object is recognized as, for example, a position in absolute coordinates with a representative point (such as the centroid or the center of a drive shaft) of the host vehicle M as an origin, and is used in control. The position of the object may be represented by a representative point such as the centroid or a corner of the object, or may be represented by a region. The "state" of the object may include the acceleration or jerk of the object, or a "behavior state" (for example, whether it is performing or attempting to perform a lane change).

The recognizer 130 recognizes, for example, a lane (traveling lane) in which the host vehicle M is traveling. For example, the recognizer 130 recognizes the right and left partition lines of the host vehicle M from a camera image captured by the camera 10, and recognizes the traveling lane on the basis of the position of the recognized partition lines. The recognizer 130 may recognize the traveling lane by recognizing targets (a driving boundary, a road boundary) that make it possible to specify the lane position including a shoulder, a curbstone, a median strip, guardrail, a fence, a wall, and the like without being limited to the recognition of the partition line. In this recognition, the position of the host vehicle M acquired from the navigation device 50 or processing results based on an INS may be added. The recognizer 130 may recognize an adjacent lane, a stop line, an obstacle, a red signal, a tollbooth, and other road events.

Upon recognizing a traveling lane, the recognizer 130 recognizes the position or posture of the host vehicle M with respect to the traveling lane. The recognizer 130 may recognize, for example, deviation of the host vehicle M from the center of the lane which is a reference point, and an angle formed with respect to a line aligned with the center of the lane of the host vehicle M in its traveling direction, as the relative position and posture of the host vehicle M with respect to the traveling lane. Instead, the recognizer 130 may recognize the position of the reference point of the host vehicle M or the like with respect to either lateral end portion (a partition line or a road boundary) of the traveling lane, as the relative position of the host vehicle M with respect to the traveling lane. The recognition of the traveling lane performed by the recognizer 130 and the recognition of the position and posture of the host vehicle M with respect to the traveling lane may be executed by a specifier 153 to be described later. The recognizer 130 includes, for example, an other vehicle recognizer 132. The details of this function will be described later.

The behavior plan generator 140 generates a target trajectory along which the host vehicle M will travel in the future automatically (irrespective of a driver's operation) so that the host vehicle M travels in the recommended lane determined by the recommended lane decider 61 in principle and can cope with the peripheral situation of the host vehicle. The target trajectory includes, for example, a speed element. For example, the target trajectory may be represented as a trajectory obtained by arranging points (trajectory points) at which the host vehicle M will arrive in order. The trajectory points are points at which the host vehicle M will arrive after predetermined traveling distances (for example, approximately every several [m]) which are distances along a road. Separately from the trajectory points, a target speed and a target acceleration for each predetermined sampling time (for example, approximately several tenths of a [sec]) are generated as a portion of the target trajectory. The trajectory points may be positions at which the host vehicle M will arrive at sampling times for respective predetermined sampling times. In this case, information of a target speed or target acceleration is represented by an interval between trajectory points.

The behavior plan generator 140 may set automated driving events (function) in generating a target trajectory. Examples of the automated driving events include a constant-speed traveling event, a low-speed following traveling event, a lane change event, a divergence event, a merging event, an overtaking event, and the like. The behavior plan generator 140 generates a target trajectory according to a started event. The behavior plan generator 140 includes, for example, a lane change determiner 142 and a region adjuster 144. The details of these functions will be described later.

The second controller 160 controls the traveling driving force output device 200, the brake device 210, and the steering device 220 so that the host vehicle M passes along the target trajectory generated by the behavior plan generator 140 according to scheduled times.

The second controller 160 includes, for example, an acquirer 162, a speed controller 164, and a steering controller 166. The acquirer 162 acquires information of target trajectory (trajectory point) generated by the behavior plan generator 140, and stores the acquired information in a memory (not shown). The speed controller 164 controls the traveling driving force output device 200 or the brake device 210 on the basis of a speed element associated with the target trajectory stored in the memory. The steering controller 166 controls the steering device 220 in accordance with the bent state of the target trajectory stored in the memory. The processes of the speed controller 164 and the steering controller 166 are realized by, for example, a combination of feedforward control and feedback control. As an example, the steering controller 166 executes a combination of feedforward control according to the curvature of a road in front of the host vehicle M and feedback control based on deviation from the target trajectory.

The HMI controller 170 notifies an occupant of predetermined information through the HMI 30. The predetermined information includes, for example, information related to traveling of the host vehicle M such as information on the state of the host vehicle M or information on driving control. The information on the state of the host vehicle M includes, for example, the speed of the host vehicle M, the engine speed, the shift position, and the like. The information on driving control includes, for example, an inquiry as to whether to perform a lane change, a result of determination as to whether a lane change can be executed, whether to execute a driving mode, information on changing the driving mode, information imposed on an occupant which is required to switch the driving mode (information on a task request for the occupant), information on the status of driving control (for example, content of the event being executed), and the like. The predetermined information may include information which is not relevant to traveling control of the host vehicle M such as a television program or content (for example, a move) stored in a storage medium such as a DVD. The predetermined information may include, for example, the current position and destination of the host vehicle M, information on the remaining amount of fuel, and the like.

For example, the HMI controller 170 may generate an image including the above-described predetermined information to display the generated image on a display device of the HMI 30, or may generate a sound indicating predetermined information to output the generated sound from a speaker of the HMI 30. The HMI controller 170 may output information accepted by the HMI 30 to the communication device 20, the navigation device 50, the first controller 120, and the like.

The traveling driving force output device 200 outputs a traveling driving force (torque) for a vehicle to travel to a driving wheel. The traveling driving force output device 200 includes, for example, a combination of an internal-combustion engine, an electric motor, a transmission or the like, and an electronic control unit (ECU) that controls these components. The ECU controls the above components in accordance with information which is input from the second controller 160 or information which is input from the driving operator 80.

The brake device 210 includes, for example, a brake caliper, a cylinder that transfers hydraulic pressure to the brake caliper, an electric motor that generates hydraulic pressure in the cylinder, and a brake ECU. The brake ECU controls the electric motor in accordance with the information which input from the second controller 160 or the information which input from the driving operator 80, and causes a brake torque according to a braking operation to be output to each wheel. The brake device 210 may include a mechanism that transfers hydraulic pressure generated by the operation of a brake pedal included in the driving operator 80 through a master cylinder to the cylinder as a backup. The brake device 210 is not limited to the above-described configuration, and may be an electronic control type hydraulic brake device that controls an actuator in accordance with the information which is input from the second controller 160 and transfers hydraulic pressure of the master cylinder to the cylinder.

The steering device 220 includes, for example, a steering ECU and an electric motor. The electric motor changes the direction of a turning wheel, for example, by causing a force to act on a rack and pinion mechanism. The steering ECU drives the electric motor in accordance with the information which is input from the second controller 160 or the information which is input from the driving operator 80, and changes the direction of the turning wheel.

[Other Vehicle Recognizer, Lane Change Determiner, Region Adjuster]

Figure 3:
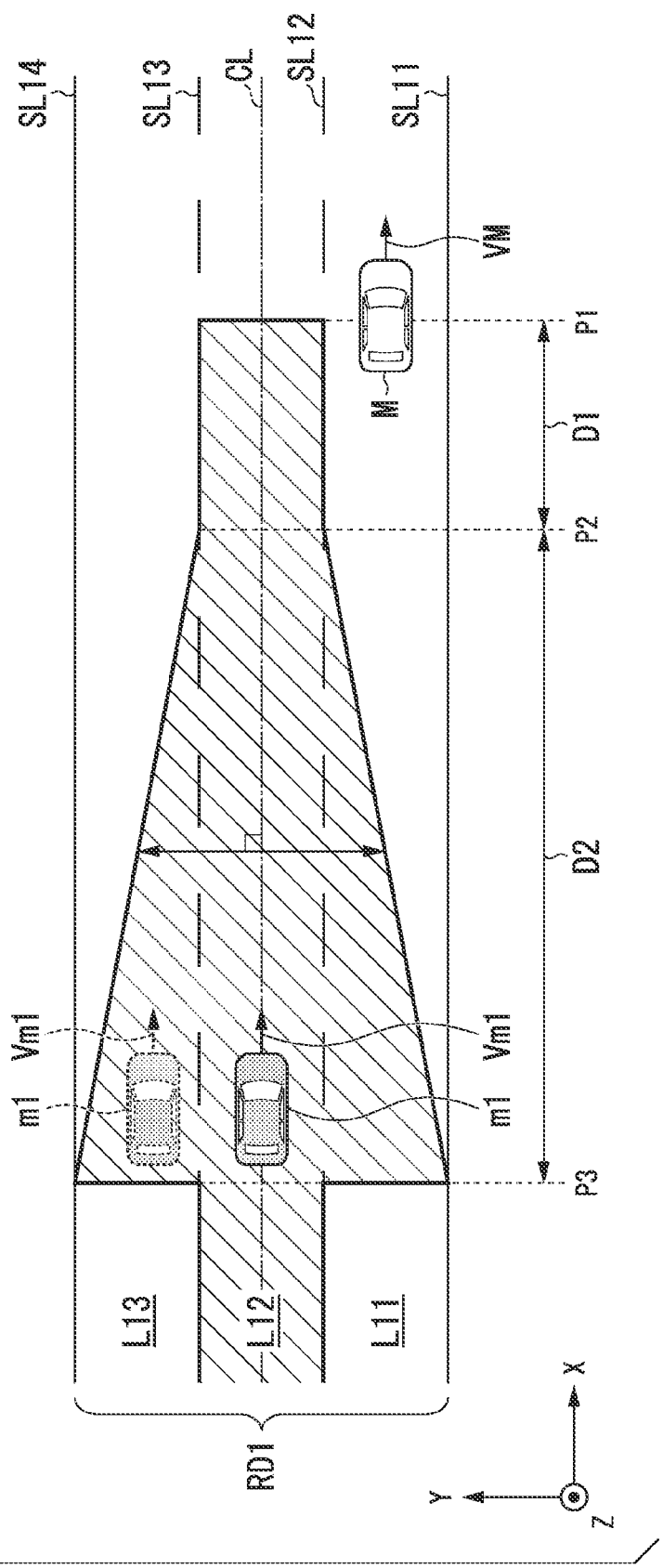
FIG. 3 is a diagram illustrating recognition of another vehicle and region adjustment during a lane change.

Hereinafter, the details of functions of the other vehicle recognizer 132, the lane change determiner 142, and the region adjuster 144 will be described in detail. FIG. 3 is a diagram illustrating recognition of another vehicle and region adjustment during a lane change. A case where another vehicle behind the host vehicle M is recognized will be described below. The same process may be performed in a case where another vehicle in front of the host vehicle M is recognized. The example of FIG. 3 shows a road RD1 including lanes L11 to L13 in which travel in the same direction (X-axis direction in the drawing) is possible. The lane L11 is partitioned by road partition lines SL11 and SL12, the lane L12 is partitioned by road partition lines SL12 and SL13, and the lane L13 is partitioned by road partition lines SL13 and SL14. In the example of FIG. 3, it is assumed that the host vehicle M is traveling in the lane L11 at a speed VM, and another vehicle m1 is traveling in the lane L12 behind the host vehicle M at a speed Vm1.

The other vehicle recognizer 132 recognizes another vehicle in the vicinity of the host vehicle M (within a predetermined distance from the host vehicle M) from feature information such as the shape and size of an object on the basis of information input from the external sensor ES. The other vehicle recognizer 132 recognizes the relative position and relative speed between the host vehicle M and the other vehicle. The other vehicle recognizer 132 may recognize whether the other vehicle m1 is approaching the host vehicle M or moving away from the host vehicle on the basis of the amount of change in the relative position and relative speed.

The lane change determiner 142 determines whether it is necessary to perform a lane change from the lane L11 (an example of a first lane) in which the host vehicle M is traveling to the adjacent lane L12 (an example of a second lane) through driving control at present or in the future. For example, the lane change determiner 142 determines whether the host vehicle M needs to perform a lane change in order to travel toward a destination in a case where the destination is set in advance. In a case where a blinker switch provided on the HMI 30 or the like is operated by an occupant, the lane change determiner 142 may determine that it is necessary to perform a lane change in a direction indicated by driving control such as automated driving. The lane change determiner 142 may determine that it is necessary to perform a lane change in the case of passing a preceding vehicle or in a case where it is necessary to avoid an obstacle.

Here, in a case where the host vehicle M executes a lane change from the lane L11 to the lane L12, the behavior plan generator 140 generates a target trajectory for performing a lane change to avoid contact with objects (such as other vehicles) in the vicinity on the basis of the detection result of the external sensor ES, and the second controller 160 causes the host vehicle M to travel along the target trajectory to thereby execute a lane change. However, in a case where the position (especially lateral position) of the other vehicle cannot be correctly determined due to the recognition error of the external sensor ES, there is a possibility that the other vehicle may be erroneously recognized to be traveling in the lane L13 (adjacent lane) located further inward (two lanes away) or erroneously recognized to be traveling in the same lane as the traveling lane L11 of the host vehicle M despite the other vehicle m1 actually traveling in the lane L12 which is a lane change destination, for example, as shown in FIG. 3. The recognition error (measurement error) of such a sensor becomes larger especially as the distance from the host vehicle M increases. Therefore, in a case where it is determined that the recognition error described above does not interfere with the target trajectory for a lane change of the host vehicle M, it may not be possible to appropriately suppress the lane change in situations where the lane change should essentially not be performed.

Consequently, in the present embodiment, in a case where the host vehicle M performs a lane change and a case where it is recognized that there is another vehicle in the vicinity of the host vehicle M, the region adjuster 144 extends a region (range) to be recognized during a lane change of the host vehicle M (during control related to the lane change) to include regions other than the lane L12 on the basis of the relative speed ΔV between the host vehicle M and the other vehicle m1. For example, the region adjuster 144 changes the range to be recognized as the lane L12 which is a lane change destination on the basis of the relative speed ΔV between the host vehicle M and the other vehicle m1. The relative speed ΔV is a relative speed in a case where the other vehicle m1 is approaching the host vehicle M. For example, the region adjuster 144 refers to the adjustment table 182 stored in the storage 180 on the basis of the relative speed ΔV to acquire the extended range of the lane-change destination lane (in other words, the extended range outside the region which is a lane change destination) associated with the relative speed ΔV.

FIG. 4 is a diagram illustrating an example of content of the adjustment table 182. In the adjustment table 182, for example, the relative speed is associated with information on the extended range of the lane-change destination lane. For example, in a case where the relative speed ΔV between the host vehicle M and the other vehicle m1 is equal to or lower than a first threshold Vth1, the region adjuster 144 does not extend (does not adjust) the range of the lane-change destination lane. In a case where the relative speed ΔV is higher than the first threshold Vth1 and equal to or lower than a second threshold Vth2 (second threshold Vth2>first threshold Vth1), the region adjuster 144 extends the range of the lane-change destination lane in the lateral direction of the road (road width direction: Y-axis direction in FIG. 3). Specifically, the region adjuster 144 extends the adjacent lane L12 by one lane (a distance equivalent to the lane width (lateral width) of the lane L2) in the right-left road width direction (hereinafter referred to as a "first extended range"). In a case where the relative speed ΔV is higher than the second threshold Vth2, the region adjuster 144 makes the range of the lane-change destination lane wider than the first extended range (hereinafter referred to as a "second extended range"). The second extended range is made even wider than the first extended range in the lateral direction of the road RD1. Specifically, the region adjuster 144 further extends the region of the lane L12 which is a lane change destination by two lanes (a distance equivalent to twice the lane width of the lane L12) in the right-left road width direction with respect to the region of the lane-change destination lane. In this way, the region adjuster 144 extends the range of the lane-change destination lane recognized by the recognizer 130 on the basis of the magnitude of the relative speed ΔV.

The recognition error of the external sensor ES becomes larger as the distance from the host vehicle M increases. Therefore, the region adjuster 144 may not extend the lane-change destination lane up to a position which is a first predetermined distance away from the reference position (for example, centroid) of the host vehicle M. The region adjuster 144 may adjust the extended range in the lateral direction (road width direction, right-left direction) to gradually (or stepwise) become larger as the distance from the first predetermined distance increases. The region adjuster 144 may not extend the second lane beyond a second predetermined distance (farther than the second predetermined distance) which is farther from the host vehicle M than the first predetermined distance. In this case, the region adjuster 144 adjusts, for example, the extended range at the position of the second predetermined distance to the maximum value (maximum width) of the extended range designated in the adjustment table 182. Here, the first predetermined distance may be, for example, a distance at which the recognition error of the external sensor ES is specified by a sensor manufacturer or the like to be equal to or less than a predetermined value, or may be a fixed distance. The second predetermined distance may be a distance which is set on the basis of a range that has to be recognized in order to determine whether a lane change can be performed, as specified by laws and regulations in a case where lane change control is executed through automated driving, may be a distance which is set on the basis of the performance limits of the external sensor ES, or may be a fixed distance.

The example of FIG. 3 shows a case where the relative speed ΔV between the host vehicle M and the other vehicle m1 is higher than the first threshold Vth1 and equal to or lower than the second threshold Vth2. In this case, the region adjuster 144 symmetrically extends the region of the lane L12 which is a lane change destination backward from the position P1 of the host vehicle M in the road width direction (Y-axis direction in the drawing) with the center CL of the lane L12 as a reference. In the example of FIG. 3, the region adjuster 144 does not extend the region of the lane L12 up to a position P2 which is a distance D1 away from the position P1 of the host vehicle M, and extends a target range up to a position P3 which is a further distance D2 away from the position P2 so as to gradually extend in the road width direction (lateral direction) as the distance from the host vehicle M increases. The distance D1 is an example of the first predetermined distance, and a distance (D1+D2) obtained by adding the distances D1 and D2 is an example of the second predetermined distance. A portion of the lane L12 which is farther from the host vehicle M than the position P3 may not be extended, and may not be used in the other vehicle recognition process during a lane change.

The lane change determiner 142 specifies the position of the other vehicle m1 on the basis of a region (shaded area in the figure) of the lane-change destination lane adjusted by the region adjuster 144, and executes control related to a lane change on the basis of the specified position. Examples of the control related to a lane change include control to determine whether the host vehicle M can perform a lane change to the lane L12 on the basis of the relative position, relative speed, or the like of another vehicle in the lane L12 which is a lane change destination, and control to generate a target trajectory for performing a lane change on the basis of the determination result or a target trajectory for continuing to travel in the current traveling lane by suppressing a lane change and to cause the host vehicle M to travel along the generated target trajectory.

Since the range to be recognized by the region adjuster 144 as the lane-change destination lane is set to the extended range (shaded area in the figure) as a result of the above-described processing, the lane change determiner 142 can recognize that the other vehicle m1 recognized as traveling in a lane other than the lane-change destination lane due to erroneous recognition is also present in the lane-change destination lane, and determine whether the lane change can be performed.

For example, the lane change determiner 142 determines whether there is a possibility of collision with another vehicle due to the lane change of the host vehicle M. For example, the lane change determiner 142 derives a time to collision TTC using the relative position (relative distance) and relative speed between the host vehicle M and the other vehicle m1, determines that there is a possibility of collision in a case where the derived time to collision TTC is less than a threshold, and determines that there is no possibility of collision in a case where it is equal to or greater than the threshold. The time to collision TTC is, for example, a value which is calculated by dividing the relative speed from the relative distance. The lane change determiner 142 determines not to execute (suppress) the lane change in a case where it is determined that there is a possibility of collision, and determines to execute the lane change in a case where it is determined that there is no possibility of collision. Therefore, in a case where the other vehicle m1 is recognized to be in an adjacent lane which is a lane change destination in a range where there is a high possibility of the position of the other vehicle m1 being erroneously recognized, giving priority to safety allows a more appropriate determination of whether the lane change can be performed without colliding with another vehicle on the basis of the position and speed of the other vehicle.

In a case where the other vehicle m1 is recognized to be in a region (extended region) other than the region partitioned by the road partition lines SL12 and SL13 in the range to be recognized as the lane L12, the lane change determiner 142 may determine that the lane change is not executed (the lane change is suppressed) without determining whether there is a possibility of collision. Since the extended region is a region which is more likely to be erroneously recognized by the external sensor ES, it is possible to execute lane change control with higher safety by suppressing the lane change in a case where another vehicle is recognized to be in the region. The behavior plan generator 140 generates a target trajectory for performing a lane change in a case where it is determined by the lane change determiner 142 that the lane change is possible, and generates a target trajectory for continuing to travel in the current traveling lane by suppressing the lane change in a case where it is determined that the lane change is not possible.

Figure 5:
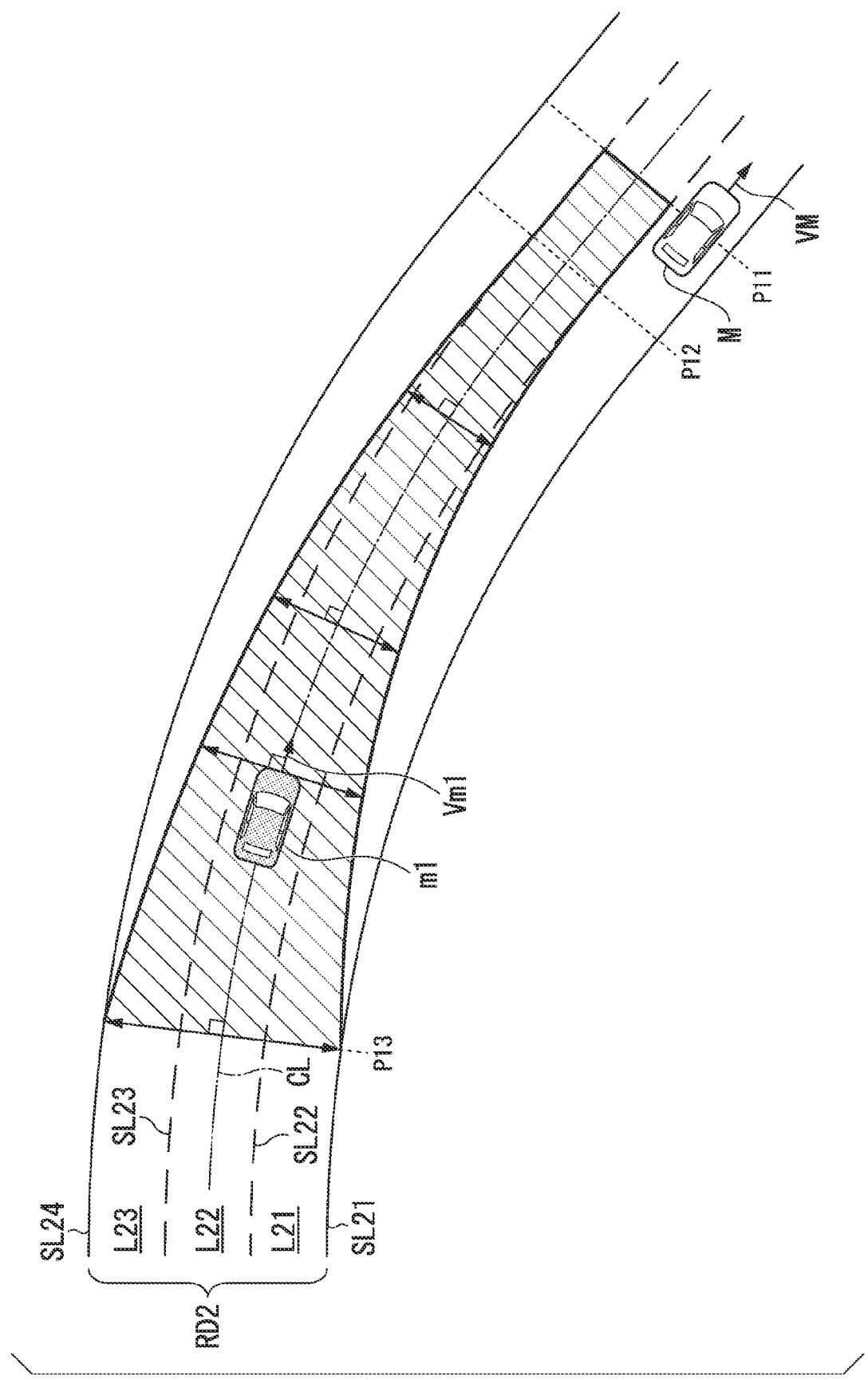
FIG. 5 is a diagram illustrating adjustment of an extended range in accordance with the shape of a road on which a host vehicle M travels.

The region adjuster 144 may adjust (deform) the extended range of the lane-change destination lane in accordance with the shape of a road on which the host vehicle M travels. FIG. 5 is a diagram illustrating adjustment of an extended range in accordance with the shape of a road on which the host vehicle M travels. In the example of FIG. 5, a road RD2 of which the curvature is equal to or greater than a threshold is shown as the road shape. The road RD2 includes three lanes L21 to L23. The lane L21 is partitioned by road partition lines SL21 and SL22, the lane L22 is partitioned by road partition lines SL22 and SL23, and the lane L23 is partitioned by road partition lines SL23 and SL24. In the example of FIG. 5, it is assumed that the host vehicle M is traveling in the lane L21 at a speed VM, and the other vehicle m1 is traveling in the lane L22 behind the host vehicle M at a speed Vm1.

Here, in a case where the lane change determiner 142 determines that the host vehicle M performs a lane change from the lane L21 (first lane) to the lane L22 (second lane) and a case where the recognizer 130 recognizes that there is another vehicle in the vicinity of the host vehicle M, the region adjuster 144 refers to the adjustment table 182 on the basis of the relative speed between the host vehicle M and the other vehicle m1 to extend a region (range) recognized during a lane change of the host vehicle M (during control related to the lane change) to include regions other than the lane L22 in accordance with the set extended range. For example, the region adjuster 144 extends the range to be recognized as the lane L22 in accordance with the set extended range. Further, the region adjuster 144 determines whether the curvature of the road RD2 recognized by the recognizer 130 is equal to or greater than a threshold, and deforms the extended range on the basis of the curvature in a case where it is determined to be equal to or greater than the threshold.

In the example of FIG. 5, the road width of the lane L22 is not extended up to a position P12 which is a first predetermined distance away from a position P11 of the host vehicle M, and the road width is extended symmetrically from the position P12 to a position P13 with the center CL of the lane L22 as a reference to become larger as the distance from the host vehicle M increases. In this case, the region adjuster 144 deforms an extended range (shaded area in the figure) so that it curves at a curvature associated with the curvature of the road. The region adjuster 144 may not extend the range of the lane L22 beyond the position P13 which is a second predetermined distance away from the host vehicle M.

In the case of road shapes such as an uphill section or a downhill section where the inclination angle of a road on which a vehicle is traveling is equal to or greater than a predetermined value in addition to (or instead of) the curvature, the region adjuster 144 may adjust the extended range to be wider than that of a flat road (a road of which the inclination angle is less than a predetermined value). The region adjuster 144 may adjust the extended range to be wider in a case where the recognition accuracy of the external sensor ES is predicted to deteriorate more than normal due to the surrounding environment of a road on which a vehicle is traveling (such as, for example, nighttime or heavy rain). Thereby, the lane change determiner 142 can more appropriately determine whether the lane change can be executed even in the extended range of the lane-change destination lane adjusted in accordance with the road shape and surrounding environment of a curved road or the like.

[Process Flow]

Figure 6:
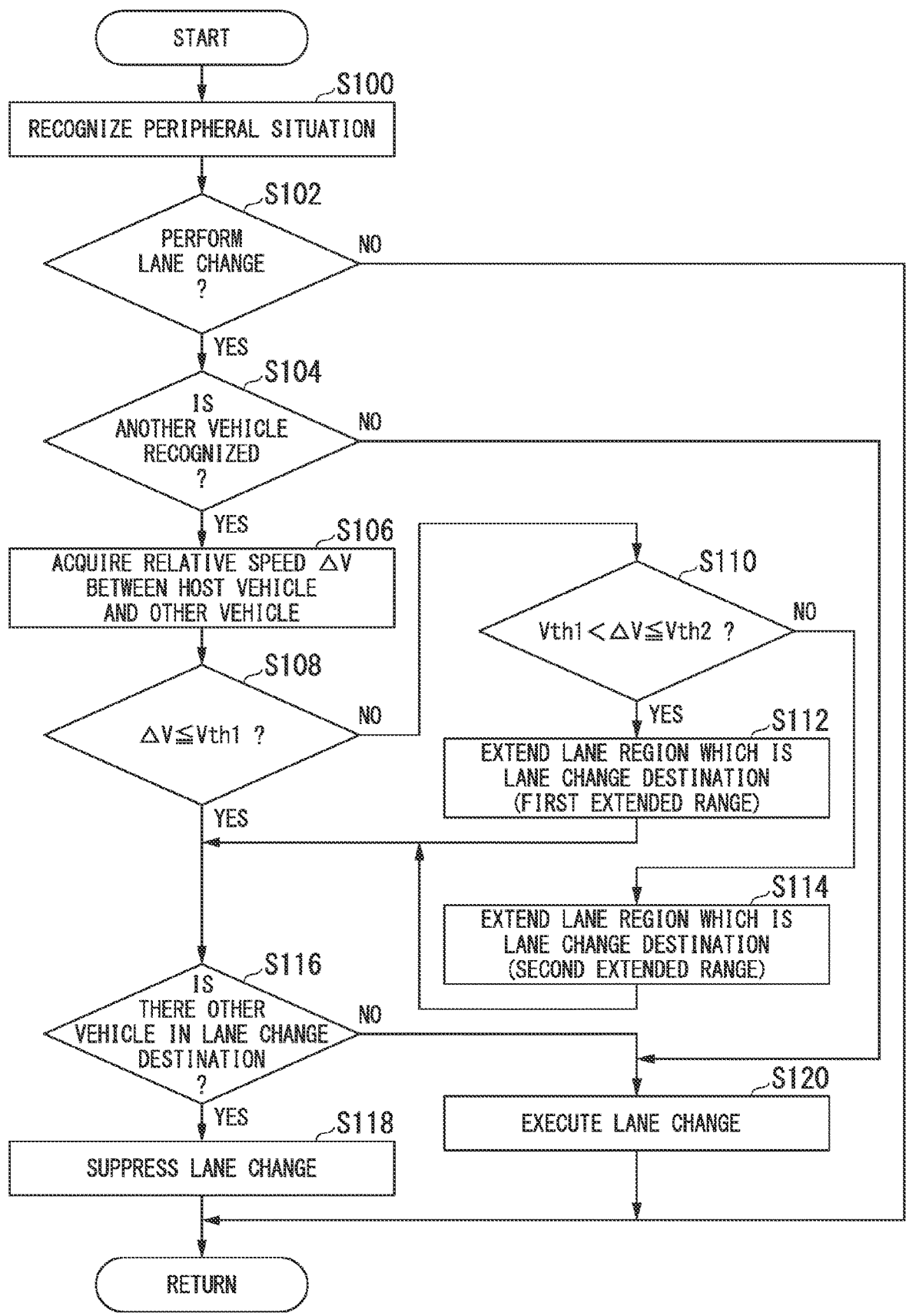
FIG. 6 is a flowchart illustrating an example of a flow of processes which are executed by an automated driving control device of the embodiment.

FIG. 6 is a flowchart illustrating an example of a flow of processes which are executed by the automated driving control device 100 of the embodiment. In the processes shown in FIG. 6, description will focus mainly on a lane change control process among various processes which are executed by the automated driving control device 100. The processes shown in FIG. 6 may be repeatedly executed in a predetermined period or at a predetermined timing.

In the example of FIG. 6, the recognizer 130 recognizes the peripheral situation of the host vehicle M (step S100). The process of step S100 includes a process in which the other vehicle recognizer 132 recognizes another vehicle. Next, the lane change determiner 142 determines whether a lane change is performed (step S102). In a case where it is determined that the lane change is performed, the lane change determiner 142 determines whether another vehicle is recognized in the vicinity of the host vehicle M (step S104). In a case where it is determined that the other vehicle is recognized, the region adjuster 144 acquires a relative speed ΔV between the host vehicle and the other vehicle (step S106).

Next, the region adjuster 144 determines whether the relative speed ΔV is equal to or lower than the first threshold Vth1 (step S108). In a case where it is determined that the relative speed ΔV is equal to or lower than the first threshold Vth1, the region adjuster 144 does not extend the lane which is a lane change destination, and step S116 and the subsequent steps are executed. In a case where it is determined that the relative speed ΔV is not equal to or lower than the first threshold Vth1, the region adjuster 144 determines whether the relative speed ΔV is higher than the first threshold Vth1 and equal to or lower than the second threshold Vth2 (step S110). In a case where it is determined that the relative speed ΔV is higher than the first threshold Vth1 and not equal to or lower than the second threshold Vth2, the region adjuster 144 extends the lane region which is a lane change destination (extends to the first extended range) (step S112). In a case where the relative speed ΔV does not satisfy the condition of the determination process in step S110 (that is, in a case where it is determined that the relative speed ΔV is higher than the second threshold Vth2), the region adjuster 144 extends the lane region which is a lane change destination (extends to the second extended range) (step S114).

After the process of step S112 or S114, or in a case where it is determined in the process of step S108 that the relative speed ΔV is equal to or lower than the first threshold Vth1, the lane change determiner 142 determines whether there is another vehicle in the lane change destination of the host vehicle M (step S116). The process of step S116 may be replaced with "determining whether there is another vehicle with a high possibility of collision with the host vehicle M in the lane which is a lane change destination." In a case where it is determined that there is another vehicle in the lane change destination, the lane change determiner 142 determines not to execute a lane change to the lane change destination of the host vehicle M, and suppresses the lane change (step S118). In a case where it is determined that there is no other vehicle in the lane change destination, the determiner determines that the lane change can be executed, generates a target trajectory for performing a lane change, and causes the lane change to be executed (step S120). In addition, in a case where it is determined in the process of step S104 that the other vehicle is not recognized, the lane change determiner 142 determines that the lane change can be executed, generates a target trajectory for performing a lane change, and causes the lane change to be executed (step S120). This terminates the processing of the present flowchart. In addition, in a case where it is determined in the process of step S102 that the lane change is not performed, the processing of the present flowchart ends. In the present embodiment, "extending the vehicle region which is a lane change destination" in the processes of steps S112 and S114 described above may be rephrased as "extending the region to be recognized during control related to the lane change to include a region other than the lane which is a lane change destination."

According to the above-described embodiment, even in a case where another vehicle traveling in the lane-change destination lane (adjacent lane) is erroneously recognized as traveling in another lane, it is possible to determine whether the lane change can be executed with a higher degree of safety. Since the target is another vehicle with a high relative speed in the embodiment, it is possible to execute control which is highly acceptable to a driver.

[Modification Example]

In the above-described embodiment, in a case where a plurality of other vehicles are recognized by the other vehicle recognizer 132, the region adjuster 144 may set the extended range on the basis of the highest relative speed among the relative speeds between each of the other vehicles and host vehicle.

In the above-described embodiment, although the region adjuster 144 extends the lane which is a lane change destination symmetrically in the lateral direction with the center of the lane as a reference, the extension mode may be changed in accordance with the traveling situation of the host vehicle M. For example, in a case where it is obvious (correctly recognized) that the host vehicle M is traveling in the lane on the end side of a five-lane road and a case where the relative speed ΔV between the host vehicle M and the other vehicle is higher than the second threshold Vth2, only one lane (that is, to the width of the traveling lane of the host vehicle M) may be extended instead of extending to two lanes from the adjacent lane to the host vehicle M side. Thereby, it is possible to suppress the extension of the road region to a position where it is obvious that there is no road.

According to the embodiment as described above, there is provided a vehicle control device including: a recognizer 130 that recognizes a peripheral situation of a host vehicle M; and a driving controller that controls one or both of steering and speed of the host vehicle M on the basis of a result of recognition performed by the recognizer 130, wherein, in a case where the host vehicle M traveling in a first lane performs a lane change to a second lane adjacent to the first lane and a case where it is recognized by the recognizer 130 that there is another vehicle in the vicinity of the host vehicle M, the driving controller specifies a position of the other vehicle by changing a range to be recognized as the second lane on the basis of a relative speed between the host vehicle M and the other vehicle, and executes control related to the lane change on the basis of the specified position, whereby it is possible to execute more appropriate lane change control.

For example, a timing (relative distance) at which the lane change is to be suppressed changes depending on the relative speed between the host vehicle M and the other vehicle. Therefore, in the embodiment, the range of the lane-change destination lane with the position of the host vehicle M as a reference is set in accordance with the relative speed, and the position of the other vehicle is specified in consideration of the maximum error of the sensor assumed for the set range. Further, in the embodiment, as the vehicle moves farther away, where the recognition error becomes larger, another vehicle which is determined to be traveling in a lane next to two lanes or in a lane of the host vehicle is also prevented from performing a lane change by extending the suppression condition. Thereby, it is possible to more appropriately determine whether the lane change can be executed. According to the embodiment, since the range of influence of a sensor error on lane determination changes while traveling on a curve, it is possible to determine whether the lane change can be executed in a range corresponding to the shape of a road by deforming the range of a lane to be recognized as a lane change destination on the basis of the curvature of a curve during traveling.

The above-described embodiment can be represented as follows.

A vehicle control device including:
a storage medium having computer-readable instructions stored therein; and
a processor connected to the storage medium,
wherein the processor executes the computer-readable instructions to
recognize a peripheral situation of a host vehicle,
execute driving control to control one or both of steering and speed of the host vehicle on the basis of a result of recognition performed by a recognizer,
specify, in a case where the host vehicle traveling in a first lane performs a lane change to a second lane adjacent to the first lane and a case where it is recognized that there is another vehicle in the vicinity of the host vehicle, a position of the other vehicle by changing a range to be recognized as the second lane on the basis of a relative speed between the host vehicle and the other vehicle, and
execute control related to the lane change on the basis of the specified position.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle control device comprising:
a recognizer that recognizes a peripheral situation of a host vehicle; and
a driving controller that controls one or both of steering and speed of the host vehicle on the basis of a result of recognition performed by the recognizer,
wherein, in a case where the host vehicle traveling in a first lane performs a lane change to a second lane adjacent to the first lane and a case where it is recognized by the recognizer that there is an other vehicle in a vicinity of the host vehicle, the driving controller changes a range to be recognized as the second lane on the basis of a relative speed between the host vehicle and the other vehicle, specifies a position of the other vehicle on the basis of the range, and executes at least control related to whether or not the lane change is executed on the basis of the specified position,
wherein,
in a case where the relative speed is higher than a first threshold and equal to or lower than a second threshold, the driving controller sets the range to be recognized as the second lane to a first extended range that is extended in the lateral direction of a road,
in a case where the relative speed is higher than the second threshold, the driving controller makes the range recognized as the second lane wider than the first extended range.

2. The vehicle control device according to claim 1, wherein the driving controller extends a lane width of the second lane in which the other vehicle travels to become larger as a distance from the host vehicle increases with a position that is a first predetermined distance away from the host vehicle as a reference.

3. The vehicle control device according to claim 2, wherein the driving controller does not extend the second lane beyond a second predetermined distance that is farther from the host vehicle than the first predetermined distance.

4. The vehicle control device according to claim 1, wherein, in a case where the second lane is extended, the driving controller extends the second lane symmetrically in a road width direction from a center of the second lane.

5. The vehicle control device according to claim 1, wherein the driving controller changes an extended range of the second lane on the basis of the relative speed between the host vehicle and the other vehicle.

6. The vehicle control device according to claim 1, wherein, in a case where a curvature of a road on which the host vehicle travels is equal to or greater than a third threshold, the driving controller changes the range to be recognized as the second lane in association with the curvature.

7. A vehicle control device comprising:
a recognizer that recognizes a peripheral situation of a host vehicle; and
a driving controller that controls one or both of steering and speed of the host vehicle on the basis of a result of recognition performed by the recognizer,
wherein, in a case where the host vehicle traveling in a first lane performs a lane change to a second lane adjacent to the first lane and a case where it is recognized by the recognizer that there is an other vehicle in a vicinity of the host vehicle, the driving controller extends a region to be recognized during the lane change of the host vehicle to include a region other than the second lane on the basis of a relative speed between the host vehicle and the other vehicle, specifies a position of the other vehicle on the basis of the region, and executes at least control related to whether or not the lane change is executed on the basis of the specified position,
wherein,
in a case where the relative speed is higher than a first threshold and equal to or lower than a second threshold, the driving controller sets the range to be recognized as the second lane to a first extended range that is extended in the lateral direction of a road,
in a case where the relative speed is higher than the second threshold, the driving controller makes the range recognized as the second lane wider than the first extended range.

8. A vehicle control method comprising causing a computer to:
recognize a peripheral situation of a host vehicle;
execute driving control to control one or both of steering and speed of the host vehicle on the basis of a recognized result;
change, in a case where the host vehicle traveling in a first lane performs a lane change to a second lane adjacent to the first lane and a case where it is recognized that there is an other vehicle in a vicinity of the host vehicle, a range to be recognized as the second lane on the basis of a relative speed between the host vehicle and the other vehicle;
specify a position of the other vehicle on the basis of the range;
execute at least control related to whether or not the lane change is executed on the basis of the specified position;
set, in a case where the relative speed is higher than a first threshold and equal to or lower than a second threshold, the range to be recognized as the second lane to a first extended range that is extended in the lateral direction of a road; and make, in a case where the relative speed is higher than the second threshold, the range recognized as the second lane wider than the first extended range.

9. A computer readable non-transitory storage medium having a program stored therein, the program causing a computer to:

recognize a peripheral situation of a host vehicle;

execute driving control to control one or both of steering and speed of the host vehicle on the basis of a recognized result;

change, in a case where the host vehicle traveling in a first lane performs a lane change to a second lane adjacent to the first lane and a case where it is recognized that there is an other vehicle in a vicinity of the host vehicle, a range to be recognized as the second lane on the basis of a relative speed between the host vehicle and the other vehicle;

specify a position of the other vehicle on the basis of the range;

execute at least control related to whether or not the lane change is executed on the basis of the specified position;

set, in a case where the relative speed is higher than a first threshold and equal to or lower than a second threshold, the range to be recognized as the second lane to a first extended range that is extended in the lateral direction of a road; and make, in a case where the relative speed is higher than the second threshold, the range recognized as the second lane wider than the first extended range.

* * * * *